(12) United States Patent
Schulz et al.

(10) Patent No.: US 10,781,847 B2
(45) Date of Patent: Sep. 22, 2020

(54) THREADED PIN AND SYSTEM COMPRISING A THREADED PIN AND A HOLDER

(71) Applicant: A. Raymond et Cie., Grenoble (FR)

(72) Inventors: Stefan Schulz, Lörrach (DE); Julien Friedl, Waldighoffen (FR); Ryan Ward, Clarkston, MI (US)

(73) Assignee: A. Raymond at Cie, Grenoble (FR)

( * ) Notice: Subject to any disclaimer, the term of this patent is extended or adjusted under 35 U.S.C. 154(b) by 159 days.

(21) Appl. No.: 15/579,170

(22) PCT Filed: Jun. 1, 2016

(86) PCT No.: PCT/EP2016/000892
§ 371 (c)(1),
(2) Date: Dec. 1, 2017

(87) PCT Pub. No.: WO2016/192851
PCT Pub. Date: Dec. 8, 2016

(65) Prior Publication Data
US 2018/0135684 A1    May 17, 2018

(30) Foreign Application Priority Data

Jun. 1, 2015  (DE) .......... 10 2015 210 094
Dec. 4, 2015  (DE) .......... 10 2015 015 595

(51) Int. Cl.
*F16B 35/04*  (2006.01)
*F16B 35/02*  (2006.01)
(Continued)

(52) U.S. Cl.
CPC ............ *F16B 35/02* (2013.01); *F16B 5/0225* (2013.01); *F16B 37/02* (2013.01)

(58) Field of Classification Search
CPC ...................................................... F16B 37/02
(Continued)

(56) References Cited

U.S. PATENT DOCUMENTS

| 1,315,998 A |   | 9/1919 | Southgate |
| 2,509,192 A | * | 5/1950 | Poupitch .............. F16B 15/06 411/508 |

(Continued)

FOREIGN PATENT DOCUMENTS

| DE | 52124 | 5/1890 |
| DE | 69129337 T2 | 8/1998 |

*Primary Examiner* — Gary W Estremsky
(74) *Attorney, Agent, or Firm* — Warner Norcross + Judd LLP

(57) ABSTRACT

Threaded pin made of a starting material, wherein the threaded pin comprises a base, a tip portion, which is spaced apart from the base in the direction of a longitudinal axis of the threaded pin, wherein the tip portion comprises a bridge portion, and a first side wall with an outer profile, said first side wall extending from the bridge portion to a first base part, and a second side wall with an outer profile, said second side wall extending from the bridge portion to a second base part, wherein the first side wall is formed from a different part of the starting material to the second side wall and the first base part is formed from a different part of the starting material to the second base part, wherein part of the first part is in engagement with part of the second base part, and/or part of the first base part is connected to part of the second base part, wherein, as an alternative or in addition, part of the first side wall is in engagement with part of the second side wall, and/or, in addition, part of the first side wall is connected to part of the second side wall.

21 Claims, 7 Drawing Sheets

(51) Int. Cl.
  *F16B 5/02* (2006.01)
  *F16B 37/02* (2006.01)
(58) Field of Classification Search
  USPC .............. 411/392, 418, 419, 424, 508–510
  See application file for complete search history.

(56) References Cited

U.S. PATENT DOCUMENTS

| | | | |
|---|---|---|---|
| 2,511,512 A * | 6/1950 | Poupitch | F16B 13/122 411/508 |
| 2,549,393 A * | 4/1951 | Siesel | F16B 35/00 411/419 |
| 2,555,292 A * | 5/1951 | Poupitch | F16B 9/023 285/194 |
| 2,560,211 A | 7/1951 | Burdick | |
| 2,560,530 A * | 7/1951 | Burdick | F16B 5/06 411/508 |
| 2,560,961 A | 7/1951 | Knohl | |
| 2,584,812 A | 2/1952 | Poupitch | |
| 2,596,940 A * | 5/1952 | Poupitch | F16B 21/086 411/508 |
| 2,650,516 A * | 9/1953 | Poupitch | F16B 19/002 411/508 |
| 3,006,231 A * | 10/1961 | Kahn | F16B 5/0291 411/435 |
| 3,515,194 A * | 6/1970 | Carhart | F16B 35/02 411/176 |
| 4,165,673 A | 8/1979 | Shue, Jr. et al. | |
| 5,378,097 A * | 1/1995 | Barnavol | F16B 37/02 411/183 |
| 5,755,543 A * | 5/1998 | Culpen | F16B 35/02 411/419 |
| 6,575,986 B2 * | 6/2003 | Overaker | A61B 17/0642 411/508 |

* cited by examiner

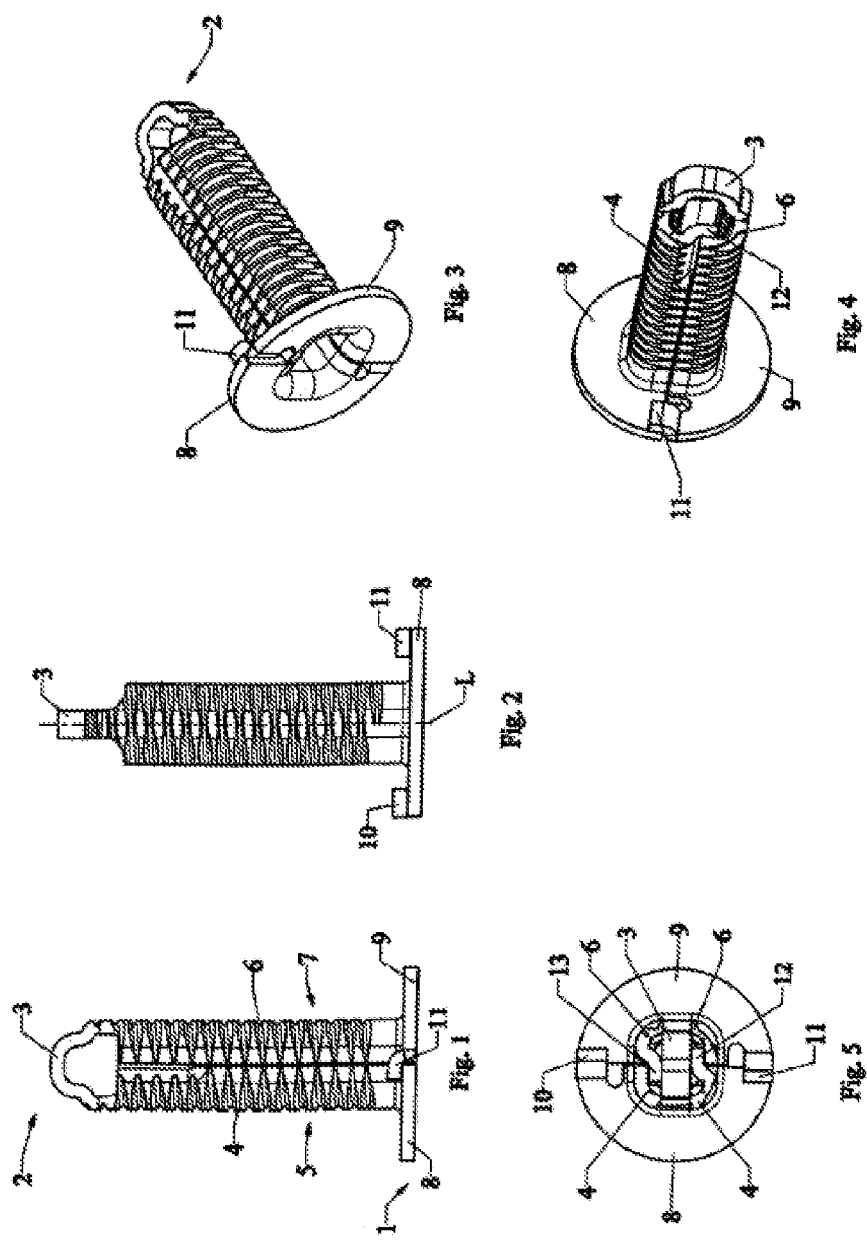

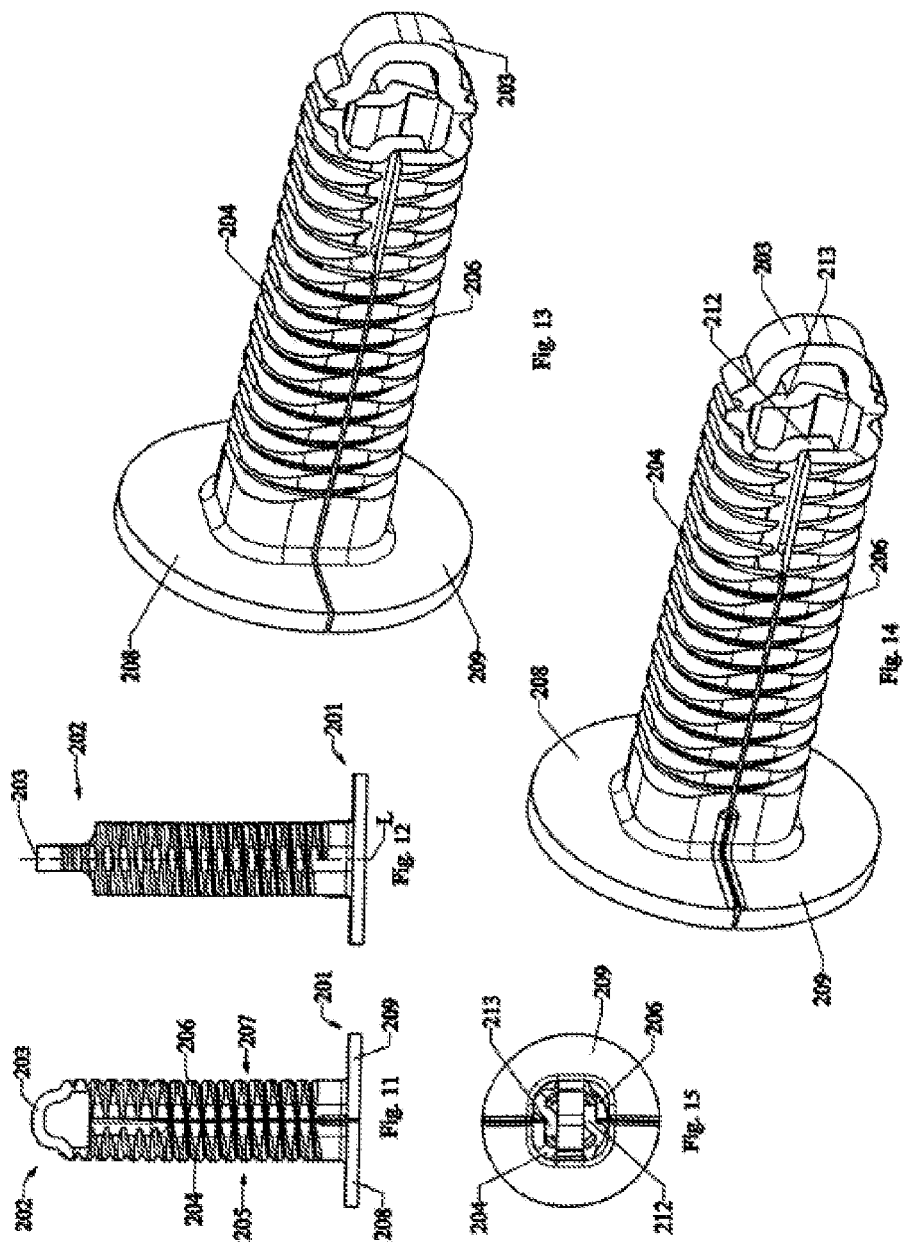

THREADED PIN AND SYSTEM COMPRISING A THREADED PIN AND A HOLDER

TECHNICAL FIELD OF THE INVENTION

The invention relates to a threaded pin according to claim 1 and to a system comprising a threaded pin and a holder according to claim 11.

BACKGROUND OF THE INVENTION

It is known for a threaded pin to be produced from a metal sheet by means of a punching/bending process; for example, U.S. Pat. Nos. 2,560,961 A and 3,068,540 A disclose such a threaded pin.

However, the known threaded pins have the disadvantage that they are not used in such a way because they are too heavy, are not stable enough and/or are not weldable.

BRIEF SUMMARY OF THE INVENTION

It is an object of the present invention to overcome at least one of the aforementioned disadvantages of the known threaded pins.

This object is achieved by the threaded pin of claim 1 and the system comprising a threaded pin and a holder of claim 11. Advantageous embodiments are represented in the dependent claims and in the description which follows.

The invention proceeds from the basic idea of creating a threaded pin from a starting material and reinforcing it such that it can be used to better effect. According to the invention, the threaded pin can be reinforced in that the threaded pin can be reinforced in a region of the threaded-pin base, which may be arranged in particular opposite a tip portion, in that a base comprising a plurality of base parts is stabilized by the base parts being in engagement with one another and/or being connected to one another; as an alternative or in addition, provision may be made for side walls of the threaded pin to be stabilized and reinforced in that the side walls are in engagement with one another and/or are connected to one another.

The invention creates a threaded pin which has a base, a tip portion and two side walls, wherein the base comprises two base parts. The tip portion is spaced apart from the base in the direction of a longitudinal axis of the threaded pin and comprises a bridge portion. The side walls each have an outer profile. The first side wall extends from the bridge portion to the first base part and the second side wall extends from the bridge portion to the second base part. The first side wall is formed from a different part of the starting material to the second side wall and the first base part is formed from a different part of the starting material to the second base part. The two side walls and the two base parts therefore need not be connected to one another directly. The two side walls and the base parts are connected in particular indirectly via other portions of the threaded pin.

It is possible to create a threaded pin which, in relation to a weight of a known threaded pin or of a known screw, has a weight which is lower by approximately 50% to 75%. In particular it is possible to achieve a weight saving of 50% in relation to a threaded pin produced from solid material. It is possible to produce a threaded pin of which the weight ranges between approximately 1.5 g and approximately 4 g, in particular between approximately 2 g and approximately 3 g. Depending on the configuration of the base or of the length of the threaded portion, it is possible for the weight of the threaded pin to vary.

Within the context of the invention, the term "threaded pin" covers a fastening element which has a thread-like structure on a cylindrical portion, which may be in particular pin-like or bolt-like. The thread-like structure may constitute an at least partially slanting plane which is wound in at least partially helical form on the cylindrical portion. The fastening element configured in the form of a threaded pin may take the form of a screw-like element or of an insert element to be inserted into a component or connected thereto. A base, which adjoins the cylindrical portion directly or indirectly, can establish a further connection to another component, by virtue of the base being connected for example to the other component in particular by means of material bonding, preferably by welding or adhesive bonding.

In a first variant, part of the first base part is in engagement with part of the second base part and thus stabilizes the threaded pin. As an alternative or in addition, it is possible, in a further variant, for part of the first base part to be connected to part of the second base part.

As an alternative or in addition to the aforementioned variants, it is possible for the threaded pin to be stabilized, in a further variant, in that part of the first side wall is in engagement with part of the second wall. As an alternative or in addition to the aforementioned variants, it is possible for part of the first side wall to be connected to part of the second side wall.

The term "in engagement", within the context of the invention, covers a configuration in which the aforementioned elements are in abutment with one another, wherein one of the two elements engages over or behind the other to establish partial material doubling, which results in particular in stabilization in the direction of the normal to the two elements bearing one upon the other. Provision may also be made for a step-like structure to be formed by means of the rear engagement of one of the two elements or for the rear-engagement element to form a protrusion, and for the two elements also to be in engagement at the step or the protrusion, in which case, as an alternative or in addition to the two elements bearing one upon the other, the two elements engage essentially in a direction perpendicular to the direction in which the two elements possibly bear one upon the other.

The term "connect" in relation to the first base part and the second base part and/or the first side wall and the second side wall is understood, within the context of the invention, to be adhesive bonding and/or welding of the starting material in a portion of the aforementioned elements which can result in the threaded pin being stabilized. The term "connect" covers material bonding of the two elements, which can require in particular the use of an adhesive or of welding equipment. The welding may be, in particular, laser welding or resistance welding.

The term "stabilizing", within the context of the invention, covers the threaded pin generally retaining its shape. The relative position of the portions of the threaded pin can be essentially maintained. It is possible to counteract the forces acting on the threaded pin.

The term "outer profile", within the context of the invention covers a thread-like structure which is formed on the outer side walls of the threaded pin and can be produced, in particular, by means of a punching/bending process. The thread-like structure on the threaded pin can at least partially replicate in particular a metric thread. The thread sizes which can be established for the threaded pin may be essentially the sizes M5, M6 and larger.

A possible area of use for a threaded pin according to the invention may be that of fastening underbody panelling, a mudguard or interior panelling in the automotive sector.

The dimensions of the threaded pin may be such that the length of the threaded pin along the extent of the longitudinal axis essentially ranges from approximately 5 mm to approximately 55 mm, preferably from approximately 8 mm to approximately 50 mm, particularly preferably from approximately 10 millimetres to approximately 30 millimetres, quite particularly preferably from approximately 15 millimetres to approximately 25 millimetres. In a preferred embodiment, the length of the threaded pin is essentially approximately 20 millimetres.

The dimensions of the threaded pin may be such that the diameter of the base or a side length of the base, in the case of a polygonal, in particular rectangular, base essentially ranges from approximately 8 mm to approximately 100 millimetres, preferably from approximately 10 millimetres to approximately 60 millimetres, particularly preferably from approximately 10 millimetres to approximately 40 millimetres, quite particularly preferably from approximately 10 millimetres to approximately 20 millimetres. In a preferred embodiment, the diameter of the base or a side length of the base, in the case of a polygonal, in particular rectangular, base, is essentially approximately 11.5 millimetres. The base may be essentially round or have a number of sides in the direction transverse with the longitudinal extent of the threaded pin. In one embodiment, the base may have an essentially circular or elliptical configuration in a direction transverse to the longitudinal extent of the threaded pin. The shape of the base can be gathered in particular from an envelope of the contour of the base. For example it is possible for the circumference or the contour of the base to have one or more interruptions, in particular in the form of gaps, in particular between the base parts. The shape of the base in a direction transverse to the longitudinal extent of the threaded pin may be adapted to a holder described hereinbelow.

The thickness of the starting material from which the threaded pin may be formed may be selected essentially to range between approximately 0.4 mm and approximately 2 millimetres, in particular between approximately 0.5 millimetres and approximately 1.5 millimetres, particularly preferably approximately 0.6 millimetres and approximately 1.0 millimetres, quite particularly preferably between approximately 0.7 millimetres and approximately 0.9 millimetres. In a preferred embodiment, the thickness of the starting material from which the threaded pin may be formed is essentially approximately 0.8 millimetres.

The starting material may have a steel, aluminium and/or a fibre composition with a non-metallic or a metallic matrix. In a preferred embodiment, the starting material is a steel or a aluminium or a metallic or non-metallic fibre composite.

The preferred starting material used for the threaded pin may be a sheet-like material, in particular a metal sheet, and, in a further-preferred embodiment, the threaded pin may be produced from the sheet-like material by means of a punching/bending process.

If the description and the claims use the term "a(n)", then this term covers the singular and the plural of the element referred to in each case. The term "a(n)" does not usually preclude a plurality of such element being provided.

In a preferred embodiment, that part of the first side wall which is in engagement with part of the second side wall, and/or that part of the first side wall which is connected to part of the second side wall, is arranged closer to the tip portion than to the base portion, and therefore stabilization relates more to the part in the region of the tip of the threaded pin. Side-wall stabilization, which can be achieved by interengagement of the two side walls and/or connection of the two side walls, is thus provided more in the threaded-pin end region assigned to the tip portion, so that it is for example precisely this region, which may be more sensitive to the action of force, which is stabilized.

In a preferred embodiment, the engagement of the two side walls is such that the first side wall has a protrusion which extends in a direction at an angle to the longitudinal axis of the threaded pin and is in engagement with part of the second side wall by way of a friction fit or form fit. This can achieve the situation where the two sides bear one upon the other and the second side wall has an edge or an end butting against the protrusion formed on the first side wall and forms a form fit and/or friction fit. The two side walls can thus be stabilized in a number of directions. While the action of the two side walls bearing one upon the other can result essentially in stabilization or reinforcement in a first direction transverse to the longitudinal axis of the threaded pin, formation of a protrusion which can extend essentially parallel to the longitudinal axis of the threaded pin gives rise to stabilization or reinforcement in a second direction transverse to the longitudinal axis of the threaded pin, it being possible for the first direction to run transversely to the second direction.

In a preferred embodiment, the first base part has a protrusion which extends in a direction at an angle to the longitudinal axis of the threaded pin and is in frictionally fitting or form-fitting engagement with part of the side wall of the base part. This can achieve the situation where the base part can be used for assisting the stabilization or reinforcement of the side wall.

In a preferred embodiment, the first base part and the side wall are formed from portions of the starting material, in particular of a metal sheet, wherein the first base part is connected to the first side wall by a curved portion of the starting material, in particular of the metal sheet. Formation from a piece of the starting material, in particular of the metal sheet, is possible here. The term "connected" in this context covers the term "integrally" or "in one piece", which simplifies production, in particular as far as the number of production steps is concerned. In an alternative, or in addition, provision may be made for the second base part and the second side wall to be formed from portions of the starting material, in particular of the metal sheet, and for the second base part to be connected to the second side wall by a curved portion of the starting material, in particular of the metal sheet. It is also possible, as an alternative or in addition, for the bridge portion and the first side wall to be formed from portions of the starting material, in particular of the metal sheet, and, as an alternative or in addition, for the bridge portion and the second side wall to be formed from portions of the starting material, in particular of the metal sheet. This makes it possible to create a threaded pin which is of simple construction, is straight forward to produce and can be produced in particular in a complete state from a continuous starting material, in particular a metal sheet.

The bridge portion can stabilize the side walls, in particular in the tip portion. In a particularly preferred embodiment, the bridge portion may be of bell-shaped, quite particularly preferably Gaussian-shaped, design, in a direction transverse to the longitudinal axis of the threaded pin. This achieves a stabilizing effect for the side walls in the direction of the connection formed by the bridge portion.

The bridge portion, on account of its shape, can reinforce the two side walls essentially at the predetermined distance from one another even when the latter are subjected to external forces.

In a preferred embodiment, the first side wall, at least over part of its extent along the longitudinal axis, has a U-shaped, C-shaped or L-shaped cross section or a cross section in the form of part of a ring in a plane which is perpendicular to the longitudinal axis. Stabilization of the side wall is possible by way of the aforementioned shape, which may contain bending or angling. As an alternative and/or in addition, the second side wall, at least over part of its extent along the longitudinal axis, may have a U-shaped, C-shaped or L-shaped cross section or a cross section in the form of part of a ring in a plane which is perpendicular to the longitudinal axis. The shapes mentioned for part of the second side wall can contribute to the second side wall being stabilized. The aforementioned shapes for parts of the first and second side walls allow in particular for stabilization in relation to radial forces acting on the threaded pin.

The term "ring" in the description of the side wall in a plane transverse to the longitudinal axis of the threaded pin covers closed strip-like shapes, in particular elliptical shapes or polygonal configurations. The side wall here may form, or be, part of the strip. The term "part of a ring" covers a portion of the side wall, in particular a ring portion, ellipse portion or polygon portion. In particular it is possible to achieve a side-wall shape in which an essentially rectilinear portion is connected directly or indirectly to an elliptical portion. It is possible for a side wall of the threaded pin, in a plane transverse to the longitudinal extent of the threaded pin, to have at least two, preferably more than two, particularly preferably three, essentially rectilinear portions, of which two are connected to one another, in particular directly, by means of a ring portion, ellipse portion or polygon portion.

In a preferred embodiment, the first base part has an essentially flat surface directed away from the tip portion. It is possible here for at least the first base part to have a portion welded on a carrier part. As an alternative or in addition, the second base part may have an essentially flat surface directed away from the tip portion, as a result of which the second base part can be welded on a carrier part. A flat configuration can give rise to a stable design.

In a preferred embodiment, the threaded pin may have a holder, in which the base of the threaded pin is mounted in a displaceable manner. This can achieve the situation where a threaded pin, once fitted or installed, is displaceable in a certain region. The threaded pin may be installed, for example, in that the holder has been fastened, in particular welded, on a carrier part. The displacability can compensate for tolerances when further elements are fitted on the threaded pin.

The term "holder", within the context of the invention, covers a mounting for the base of the threaded pin, from which the threaded pin cannot be removed in the direction of the tip portion. The movement of the threaded pin relative to the holder in the direction of the longitudinal axis of the threaded pin can decrease essentially to number 0, and therefore the threaded pin is, to the greatest extent, immovable in the direction of its longitudinal axis. The threaded pin can be plugged into the holder, wherein the holder has an opening for the through-passage of the tip portion of the threaded pin. The central region of the threaded pin and the tip portion of the threaded pin are exposed, and thus not covered over the by holder, essentially when the threaded pin is retained in the holder. The base of the threaded pin may be larger than the through-passage opening for the tip portion.

The invention also creates a system comprising an aforementioned threaded pin and a holder, in which the threaded pin can be retained for displacement in a direction transverse to its longitudinal axis. As a result, it is possible to use a holder together with a threaded pin so that a threaded pin which is fastened or fitted by means of the holder can be retained for displacement in a direction transverse to its longitudinal axis so as to compensate for, for example, tolerances during fitting. It is possible to change the position of the threaded pin relative to the holder and an amount of "play" (production-specific and/or application-specific freedom of movement) for an element which can be plugged onto the threaded pin, in particular a nut, is present.

In a preferred embodiment, the threaded pin may be retained in the holder for displacement in any direction transverse to its longitudinal axis. As a result, a large amount of freedom of movement is possible and there is no need to ensure a certain advancement direction when the holder is fitted.

In a preferred embodiment, the holder has an arm which engages over the base of the threaded pin. The arm may have a base for fitting purposes, it being possible for said base to be welded, for example to a carrier part. The arm, which engages over the base, thus extends to the side of the base into a region over the base, in order to retain the threaded pin.

In a preferred embodiment, the holder has a depression which is adapted to the thickness of the base of the threaded pin. The depression may thus have a height which corresponds essentially to the thickness of the base of the threaded pin, and therefore the threaded pin is retained essentially in an immovable manner in the direction of its longitudinal axis. The surface area of the depression is greater than the base, and therefore the base of the threaded pin can be moved in the depression. The holder may be of essentially plate-like configuration, and therefore the holder may have a flat part of in particular round outer cross section, in which the depression and the through-passage opening may be configured. An at least partially closed bearing surface for bearing on a carrier part may be arranged around the periphery of the depression. The bearing surface may be welded to the carrier part.

In a preferred embodiment, the depression has a lateral abutment surface for a side surface of the base of the threaded pin. The lateral abutment surface can form an abutment surface for a side surface of the base, and it is therefore possible to prevent rotation of the threaded pin about its longitudinal axis when the lateral abutment surface is in abutment with the side surface of the base of the threaded pin.

The holder may be in one piece, it being possible for the holder to be essentially plate-like and to have a depression for the displaceable mounting of the base of the threaded pin and also a through-passage opening for the tip portion. Provision may also be made for the holder to be closed at the end which is spaced apart from the through-passage opening. The holder may comprise two interconnected parts. For example, it is possible for one part to be the plate-like part provided with a depression and a through-passage opening and for the holder—with the threaded pin inserted in the holder—to be closed by means of a second part. The two parts may be connected to one another around the periphery. The second part may be a sheet-like part which is smaller in height than in surface area. The fastening of the threaded pin with the holder on a carrier part can take place by the second part being connected, in particular welded, to the carrier part.

The term "directed away", within the context of the invention, means that there is no straight line which begins at the flat surface and intersects a point of the tip portion.

The invention will be explained in more detail hereinbelow with reference to drawings which show embodiments of the invention and in which:

BRIEF DESCRIPTION OF THE SEVERAL VIEWS OF THE DRAWINGS

FIG. 1: shows a side view of a threaded pin according to a first embodiment;

FIG. 2: shows a further side view of the threaded pin according to FIG. 1, the threaded pin having been rotated through 90° about its longitudinal axis;

FIG. 3: shows an isometric illustration of the threaded pin according to FIG. 1 as seen obliquely from above;

FIG. 4: shows an isometric illustration of the threaded pin according to FIG. 1 as seen obliquely from beneath;

FIG. 5: shows a view of the threaded pin according to FIG. 1 as seen from above;

FIG. 11: shows a side view of a threaded pin according to a third embodiment;

FIG. 12: shows a further side view of the threaded pin according to FIG. 11, the threaded pin having been rotated through 90° about its longitudinal axis;

FIG. 13: shows an isometric illustration of the threaded pin according to FIG. 11 as seen obliquely from above;

FIG. 14: shows the isometric illustration of the threaded pin according to FIG. 13 once the threaded pin has been welded in the base region;

FIG. 15: shows a view of the threaded pin according to FIG. 11 as seen from above;

DETAILED DESCRIPTION OF THE INVENTION

Figure 8:
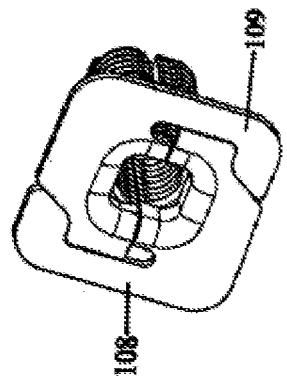
FIG. 8: shows an isometric illustration of the threaded pin according to FIG. 6 as seen obliquely from above.
Figure 9:
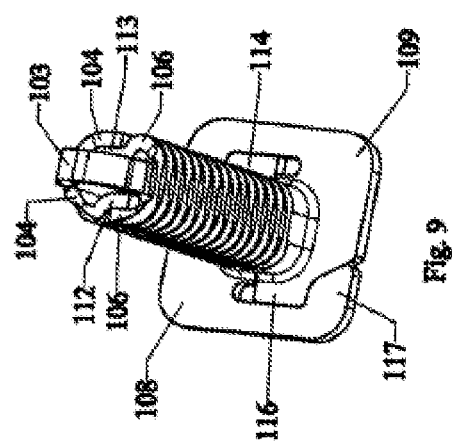
FIG. 9: shows an isometric illustration of the threaded pin according to FIG. 6 as seen obliquely from beneath.
Figure 7:
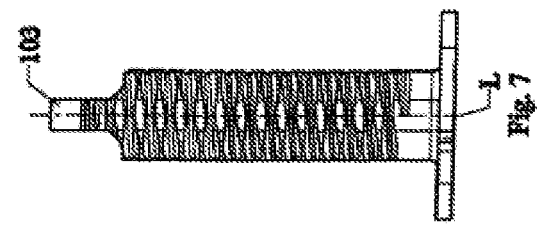
FIG. 7: shows a further side view of the threaded pin according to FIG. 6, the threaded pin having been rotated through 90° about its longitudinal axis.
Figure 6:
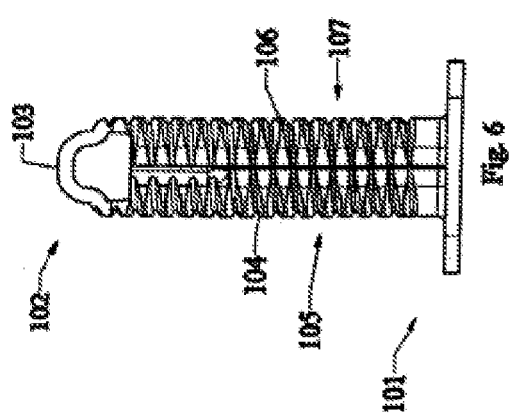
FIG. 6: shows a side view of a threaded pin according to a second embodiment.
Figure 10:
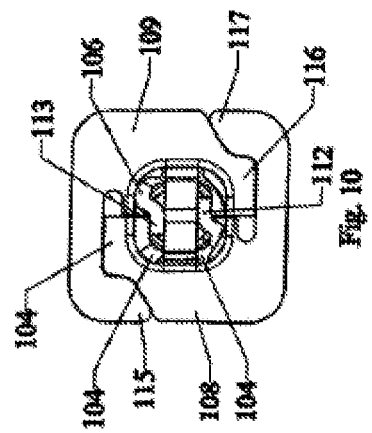
FIG. 10: shows a view of the threaded pin according FIG. 6 as seen from above.

FIGS. 1 to 5 show a threaded pin which is produced from a starting material, in particular a metal sheet. The threaded pin has a longitudinal axis L, a base 1 and a tip portion 2. The tip portion 2 is spaced apart from the base 1 in the direction of the longitudinal axis L. A bridge portion 3 is present in the tip portion 2.

In the central region of the threaded pin, the threaded pin has a first side wall 4 with an outer profile 5 and a second side wall 6 with an outer profile 7. The two side walls 4, 6 along with the outer profiles 5, 7, in the central region of the threaded pin, form an essentially circumferentially closed structured surface. The outer profiles 5, 7 replicate a screw-like thread. The cross section of the side walls 4, 6 is rounded in the form of a rounded quadrilateral (cf. FIG. 5).

The side walls 4, 6 extend from the bridge portion 3, which connects the two side walls 4, 6 in the manner of a crosspiece, to the base 1. The base 1 is of essentially circular configuration. The side wall 4 extends from the bridge portion 3 to a first base part 8 of the base 1; and the second side wall 6 extends from the bridge portion 3 to a second base part 9 of the base 1.

The first side wall 4 is formed from a different part of the metal sheet to the second wall 6 and the first base part 8 is formed from a different part of the metal sheet to the second base part 9, and therefore when the metal sheet is in its original state, prior to the threaded pin being formed, the side walls 4, 6 and the base parts 8, 9 are connected to one another merely via the bridge portion 3. When the metal sheet is in its original state, prior to the threaded pin being formed, the side walls 4, 6 and the base parts 8, 9 are symmetrical in relation to the bridge portion 3.

In the case of the threaded pin in FIGS. 1 to 5, part of the first base part 8 is in engagement with part of the second base part 9. Engagement takes place via a step-like protrusion 10, which is formed on the first base part 8, and via a step-like protrusion 11, which is formed on the second base part 9. The protrusion 10 overlaps the second base part 9 and the protrusion 11 overlaps the base part 8. Furthermore, the base parts 8, 9 butt against one another in a direction transverse to the longitudinal axis L. A form fit and/or friction fit can be formed by each of the protrusions 10, 11.

Furthermore, in the upper central region of the threaded pin, that is to say a region which is closer to the bridge portion 3 than to the base 1, part of the first side wall 4 is in engagement with part of the second side wall 6. Engagement takes place via a step-like protrusion 12, which is formed on part of the first side wall 4, and via a step-like protrusion 13, which is formed on part of the second side wall 6. The protrusion 12 engages behind part of the second side wall 6 and the protrusion 13 engages behind part of the first side wall 4.

FIGS. 6 to 10 show a further embodiment of the threaded pin. In the case of the further embodiment, elements which function identically to elements from the embodiment illustrated in FIGS. 1 to 5 are denoted by identical reference signs increased by a value of 100. The second embodiment will be described hereinbelow essentially in terms of what distinguishes it from the first embodiment.

In the case of the threaded pin in FIGS. 6 to 10, the base, in a direction transverse to the longitudinal axis L of the threaded pin, has a quadrilateral cross section with rounded corners. Part of the first base part 108 is in engagement with part of the second base part 109 by means of the two parts being locked in a plane transverse to the longitudinal axis L. A form fit for a portion 114 of the first base part 108 is achieved by a (locking) portion 115 of the second base part 109; and a form fit for a portion 116 of the second base part 109 is achieved by a (locking) portion 117 of the first base part 108.

Even if the embodiment shown in FIGS. 6 to 10 has a quadrilateral cross section for the base 101, it is also possible to have other shapes, for example a round, circular, elliptical or generally polygonal cross section.

FIGS. 11 to 15 show a further embodiment of a threaded pin. In the case of the further embodiment, elements which function identically to elements from the embodiment illustrated in FIGS. 1 to 5 are denoted by identical reference signs increased by a value of 200. The third embodiment will be described hereinbelow essentially in terms of what distinguishes it from the first embodiment.

In the case of the threaded pin in FIGS. 11 to 15, part of the first base part 208 is connected to part of the second part 209. The connection can be seen from a comparison of FIGS. 13 and 14. FIG. 13 shows the threaded pin prior to welding, and FIG. 14 shows the threaded pin following welding, of the parts of the first and second base parts 208, 209.

In respect of the interengagement and connection, in particular in the form of welding, of parts of the side walls and/or parts of the base parts, the two embodiments illustrated in the figures are interchangeable and/or can be combined with one another. All combinations of interengagement and/or connection are expressly covered.

Figure 16:
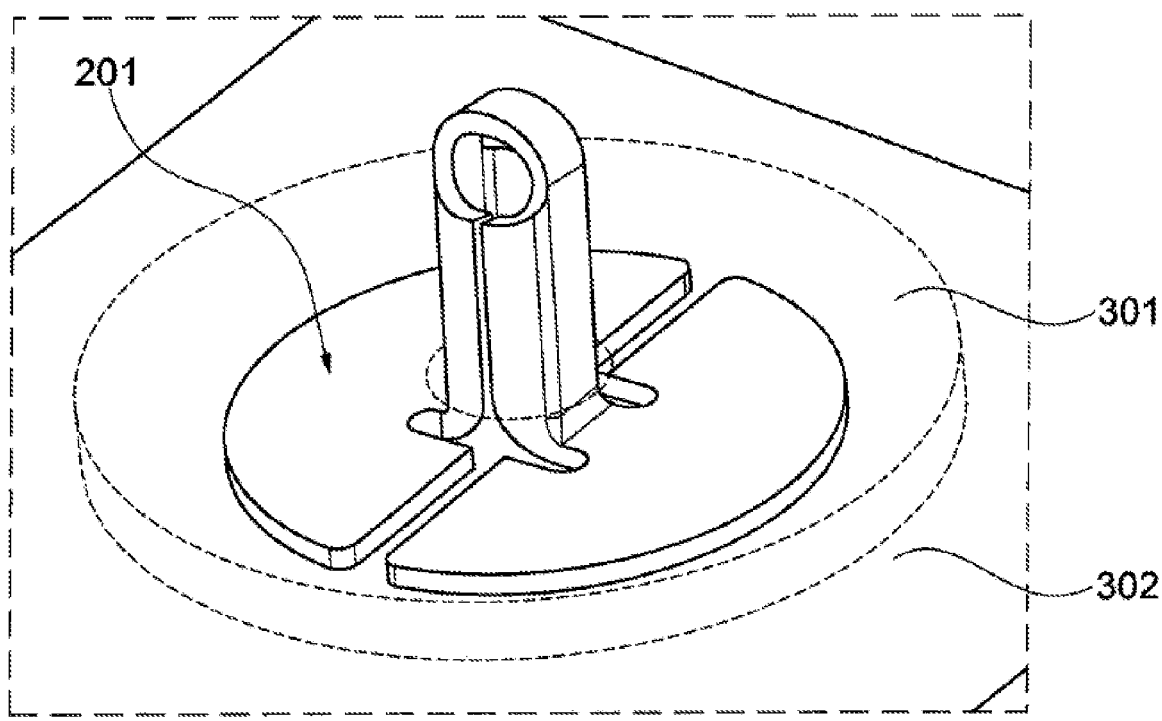
FIG. 16: shows a schematic isometric, partially transparent illustration of a threaded pin with a holder.

FIG. 16 shows a schematic isometric, partially transparent illustration of a threaded pin which has its base mounted in a displaceable manner in a holder 301. The holder 301 is welded to a carrier part 302 around the periphery. By way of example, the base of that exemplary embodiment of the threaded pin which is illustrated in FIG. 16 is denoted by reference sign 201. Other combinations of the holder 301 with the embodiments of the threaded pin and corresponding base 1, 101 which are illustrated in FIGS. 1 to 9 are also possible. The threaded pin is retained in the holder 301 for displacement in a direction transverse to its longitudinal axis. The threaded pin corresponds essentially to the exemplary embodiment illustrated in FIGS. 11 to 15. It is possible for the threaded pin to rotate in the holder 301 and be displaced in any direction transverse to its longitudinal axis.

Figure 17:
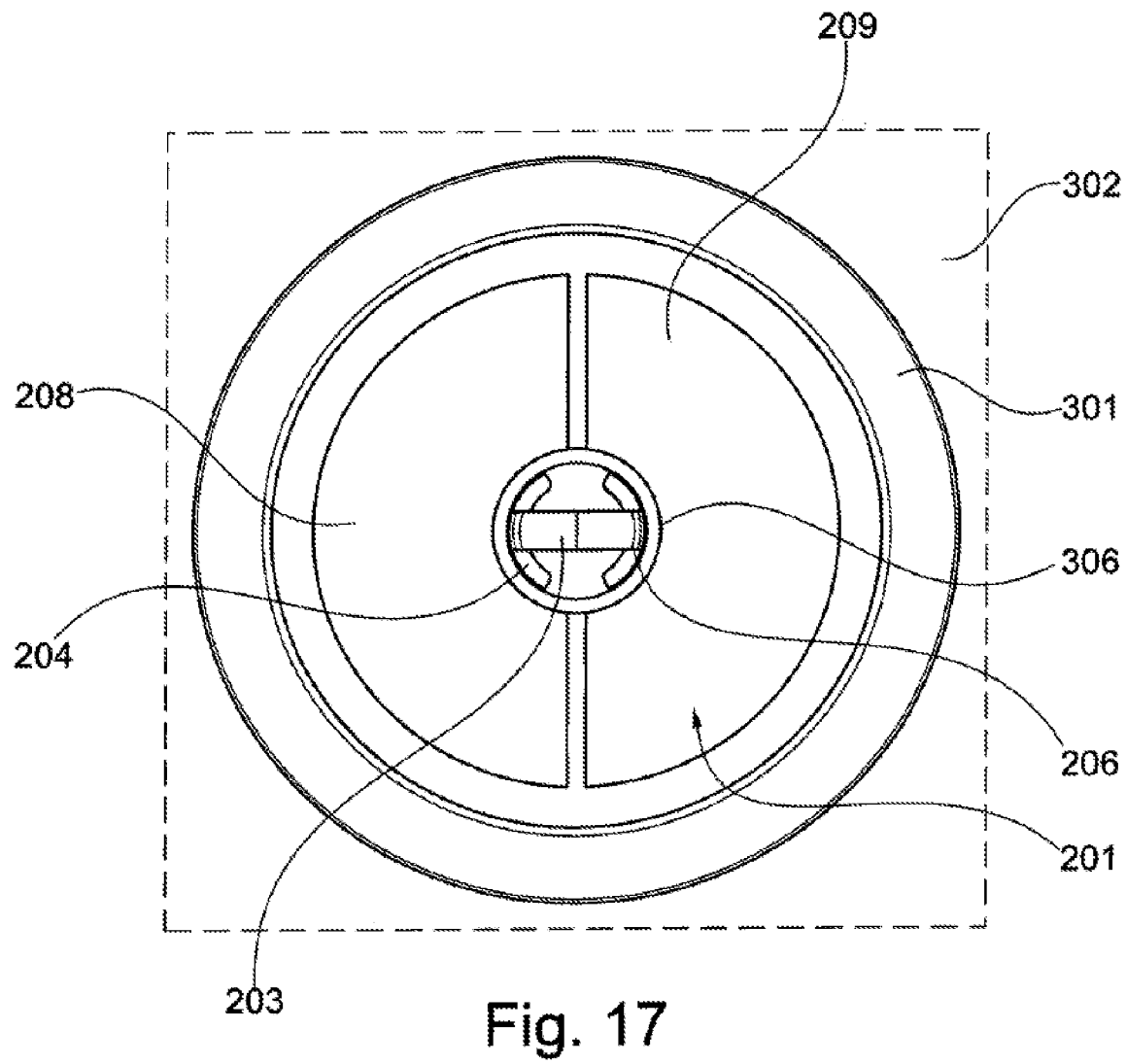
FIG. 17: shows a partially transparent illustration, as seen from above, of the threaded pin with the holder according to FIG. 16.

It can be gathered from FIG. 17, which shows a partially transparent illustration, as seen from above, of the threaded pin retained in the holder 301 according to FIG. 16, that the holder 301 has a through-passage opening 306 for the tip portion 203 and also has the central portion with the side walls 204, 206. The through-passage opening 306 in the holder 301 is larger than the cross section of the central portion of the threaded pin. The threaded pin can be displaced in the holder 301 until the central portion of the threaded pin stops against the periphery of the through-passage opening 306 and/or until the side wall 305 of the base 201 of the threaded pin stops against a lateral abutment surface 304 of the holder 301.

Figure 18:
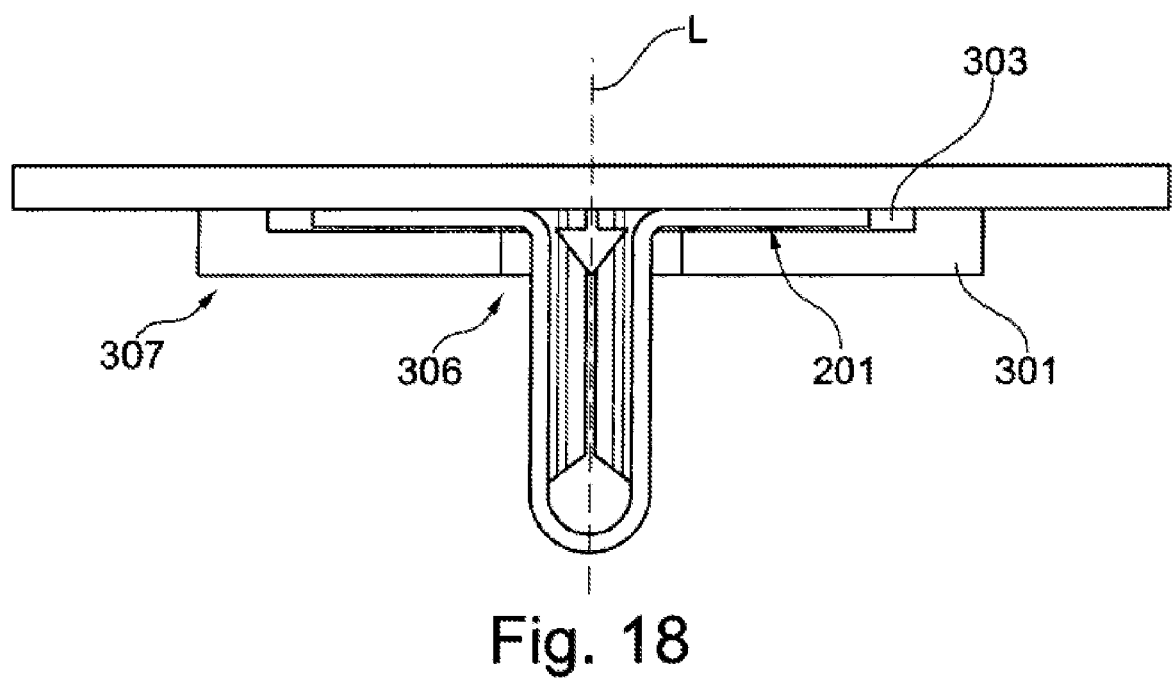
FIG. 18: shows a sectional illustration according to FIG. 16 as seen from the side.

It can be gathered from FIG. 18, which shows a sectional illustration of FIG. 16 as seen from the side, that the holder 301 has a depression 303, wherein the height of the depression 303 corresponds essentially to the extent of the base 201 in a direction parallel to the longitudinal axis L of the threaded pin. The surface area of the base 201 of the threaded pin is smaller than the size of the surface area of the depression 30, i.e. along an extent transverse to the longitudinal axis of the threaded pin.

Figure 19:
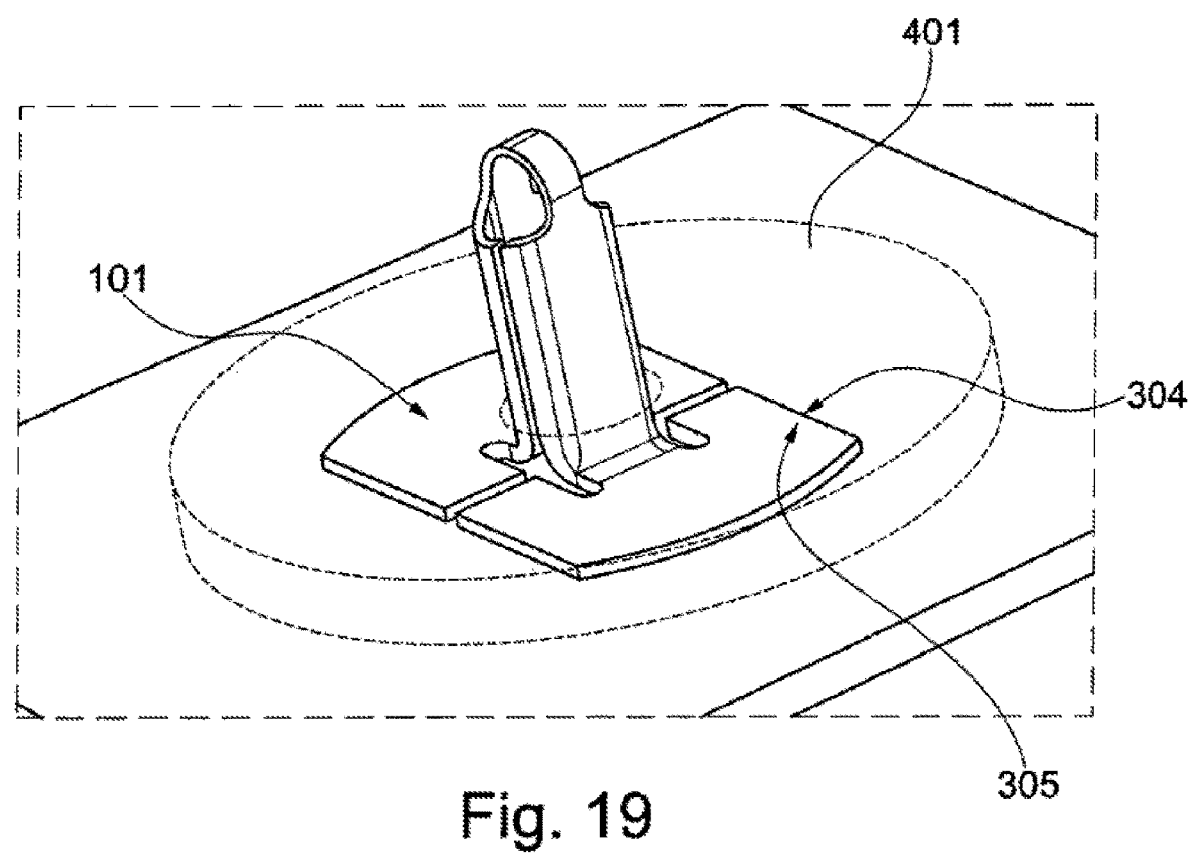
FIG. 19: shows a partially transparent isometric illustration of a further exemplary embodiment of a threaded pin with a holder.

FIG. 19 shows a partially transparent isometric illustration of a further exemplary embodiment of a threaded pin in a holder 401, wherein the threaded pin which has been used is essentially the exemplary embodiment illustrated in FIGS. 6 to 10, in which the base 101, rather than being rotationally symmetrical, is configured with an angular surface area. A lateral abutment surface 304 for a side surface 305 of the base 101 may be provided in the holder 401, said lateral abutment surface preventing rotation of the threaded pin about its longitudinal axis L in the holder 401. The threaded pin may be retained for displacement along the lateral abutment surface 304 and in a direction transverse to the lateral abutment surface 304, wherein rotation through more than 90° is ruled out since the lateral abutment surface 304 prevents rotation of the threaded pin in the holder 401.

In particular the depth of the depression formed in the holder 401 corresponds essentially to the extent of the base 101 in a direction parallel to the longitudinal axis of the threaded pin.

The invention claimed is:

1. A threaded pin, wherein the threaded pin comprises:
a base,
a tip portion, which is spaced apart from the base in the direction of a longitudinal axis of the threaded pin, wherein the tip portion comprises a bridge portion,
a first side wall with an outer profile, said first side wall extending from the bridge portion to a first base part, and a second side wall with an outer profile, said second side wall extending from the bridge portion to a second base part, wherein the first side wall is formed from a different part of a starting material to the second side wall and the first base part is formed from a different part of the starting material to the second base part,
wherein part of the first base part is in engagement with part of the second base part and/or part of the first side wall is in engagement with part of the second side wall,
wherein the first side wall has a first protrusion which extends in a direction at an angle to the longitudinal axis of the threaded pin, the first projection being in engagement with the second side wall by friction fit or form fit, and
wherein the first base part has a second protrusion which extends in a direction at an angle to the longitudinal axis of the threaded pin, the second protrusion being in engagement with the second base part by friction fit or form fit.

2. A threaded pin according to claim 1, wherein the starting material is a metal sheet.

3. The threaded pin according to claim 2, that wherein the part of the first side wall is in engagement with the part of the second side wall and is arranged closer to the tip portion than to the base.

4. The threaded pin according to claim 2, wherein the first base part and the first side wall are formed from portions of the starting material and the first base part is connected to the first side wall by a curved portion of the starting material, and/or the second base part and the second side wall are formed from portions of the starting material and the second base part is connected to the second side wall by a curved portion of the starting material, and/or the bridge portion and the first side wall are formed from portions of the starting material, and/or the bridge portion and the second side wall are formed from portions of the starting material.

5. A threaded pin according to claim 1, wherein the part of the first side wall is in engagement with the part of the second side wall and is arranged closer to the tip portion than to the base.

6. A threaded pin according to claim 1, wherein the first base part and the first side wall are formed from portions of the starting material and the first base part is connected to the first side wall by a curved portion of the starting material.

7. A threaded pin according to claim 1, wherein the bridge portion and the first side wall and the second side wall are formed from portions of the starting material and the bridge portion connects the first side wall to the second side wall.

8. A threaded pin according to claim 1, wherein the first side wall, at least over part of its extent along the longitudinal axis, has a U-shaped, C-shaped or L-shaped cross section or a cross section in the form of part of a ring in a plane which is perpendicular to the longitudinal axis.

9. A threaded pin according to claim 1, wherein the first base part has an essentially flat surface directed away from the tip portion, and/or the second base part has an essentially flat surface directed away from the tip portion.

10. A threaded pin according to claim 1, wherein the base is mounted in a displaceable manner in a holder.

11. The system comprising a threaded pin according to claim 1 and a holder, in which the threaded pin can be retained for displacement in a direction transverse to its longitudinal axis.

12. The system according to claim 11, wherein the threaded pin can be retained in the holder for displacement in any direction transverse to its longitudinal axis.

13. The system according to claim 11, wherein the holder has an arm which engages over the base.

14. The system according to claim 11, wherein the holder has a depression which is adapted to the thickness of the base of the threaded pin and has a surface area which is greater than the surface area of the base.

15. The system according to claim 14, wherein the depression has a lateral abutment surface for a side surface of the base.

16. A threaded pin according to claim 1, wherein the second base part and the second side wall are formed from portions of the starting material and the second base part is connected to the second side wall by a curved portion of the starting material.

17. A threaded pin according to claim 1, wherein the bridge portion and the first side wall are formed from portions of the starting material.

18. A threaded pin according to claim 1, wherein the bridge portion and the second side wall are formed from portions of the starting material.

19. A threaded pin according to claim 1, wherein the second side wall, at least over part of its extent along the longitudinal axis, has a U-shaped, C-shaped or L-shaped cross section or a cross section in the form of part of a ring in a plane which is perpendicular to the longitudinal axis.

20. A threaded pin comprising:
a first side wall having a first base portion, the first side wall having a first threaded portion,
a second side wall having a second base portion, the second side wall having a second threaded portion,
a flexible bridge connecting the side walls, the side walls and the bridge being integrally formed as a single piece, wherein the flexible bridge allows for movement of the side walls from a separated position in which the side walls are spaced apart to a joined position in which the side walls are not spaced apart, whereby the threaded portions of the side walls define a constant cross-section between the flexible bridge and the base when in the joined position,
wherein the first threaded portion has a first protrusion which extends in a direction at an angle to a longitudinal axis of the threaded pin, the first projection being in engagement with the second threaded portion by friction fit or form fit, and
wherein the first base portion has a second protrusion which extends in a direction at an angle to the longitudinal axis of the threaded pin, the second protrusion being in engagement with the second base portion by friction fit or form fit.

21. A threaded pin having a longitudinal axis, the pin comprising:
a base,
a tip portion spaced apart from the base in the direction of the longitudinal axis of the threaded pin, wherein the tip portion comprises a bridge portion,
a first side wall having an outer profile, the first side wall extending from the bridge portion to a first base part, and a second side wall with an outer profile, the second side wall extending from the bridge portion to a second base part, wherein the first side wall is formed from a different part of a starting material to the second side wall and the first base part is formed from a different part of the starting material to the second base part, at least one of the base parts having an essentially flat surface directed away from the tip portion,
wherein part of the first base part is in engagement with part of the second base part, and/or part of the first side wall is in engagement with part of the second side wall,
wherein the first side wall has a first protrusion which extends in a direction at an angle to the longitudinal axis of the threaded pin, the first projection being in engagement with the second side wall by friction fit or form fit, and
wherein the first base part has a second protrusion which extends in a direction at an angle to the longitudinal axis of the threaded pin, the second protrusion being in engagement with the second base part by friction fit or form fit.

* * * * *